(12) United States Patent
Torfs et al.

(10) Patent No.: US 12,299,158 B2
(45) Date of Patent: May 13, 2025

(54) METHOD, COMPUTER PROGRAM, AND DATA PROCESSING CIRCUITRY FOR ACCESS CONTROL TO ENCRYPTED DATA USING ATTRIBUTES OF THE DATA

(71) Applicant: Sony Group Corporation, Tokyo (JP)

(72) Inventors: Dimitri Torfs, Stuttgart (DE); Alexandru Serbanati, Stuttgart (DE); Michele Minelli, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 203 days.

(21) Appl. No.: 18/012,998

(22) PCT Filed: Jun. 23, 2021

(86) PCT No.: PCT/EP2021/067080
§ 371 (c)(1),
(2) Date: Dec. 27, 2022

(87) PCT Pub. No.: WO2022/017713
PCT Pub. Date: Jan. 27, 2022

(65) Prior Publication Data
US 2023/0237183 A1    Jul. 27, 2023

(30) Foreign Application Priority Data
Jul. 22, 2020 (EP) .................................. 20187169
Nov. 30, 2020 (EP) .................................. 20210800

(51) Int. Cl.
G06F 21/62    (2013.01)
G06F 21/60    (2013.01)
H04L 9/14    (2006.01)

(52) U.S. Cl.
CPC ........ *G06F 21/6218* (2013.01); *G06F 21/602* (2013.01); *H04L 9/14* (2013.01)

(58) Field of Classification Search
CPC ..... G06F 21/6218; G06F 21/602; H04L 9/14; H04L 2209/60; H04L 9/30
(Continued)

(56) References Cited

U.S. PATENT DOCUMENTS 9,894,043 B2    2/2018    Khoury et al.
10,476,863 B1   11/2019   Hanlon
(Continued)

OTHER PUBLICATIONS

International Search Report and Written Opinion mailed on Sep. 24, 2021, received for PCT Application PCT/EP2021/067080, filed on Jun. 23, 2021, 12 pages.
(Continued)

*Primary Examiner* — Bryan F Wright
(74) *Attorney, Agent, or Firm* — XSENSUS LLP (57) ABSTRACT

A method for sharing encrypted data including encrypting first data with at least one first attribute. The first attribute satisfies a first access policy of a first cryptographic key to enable one or more first users holding the first cryptographic key to decrypt the encrypted first data using the first cryptographic key. The method includes encrypting second data with at least one second attribute of the second data. The method includes generating a second cryptographic key based on a second access policy including at least one logical connective of the first attribute and the second attribute for decrypting the encrypted first data and the encrypted second data using the second cryptographic key and providing the second cryptographic key to one or more second users to enable the second users to decrypt the encrypted first data and the encrypted second data.

13 Claims, 3 Drawing Sheets

(58) Field of Classification Search
USPC .......................................................... 713/193
See application file for complete search history.

(56) References Cited

U.S. PATENT DOCUMENTS

| | | | |
|---|---|---|---|
| 11,133,926 B2* | 9/2021 | Le Van Gong | G06F 21/6218 |
| 2005/0027999 A1 | 2/2005 | Pelly et al. | |
| 2012/0144210 A1* | 6/2012 | Yacobi | H04L 9/088 |
| | | | 713/193 |
| 2014/0208122 A1 | 7/2014 | Mathur et al. | |
| 2015/0222606 A1* | 8/2015 | Yan | H04L 63/0428 |
| | | | 713/171 |
| 2016/0140347 A1* | 5/2016 | Schaad | G06F 21/6227 |
| | | | 713/165 |

OTHER PUBLICATIONS

Attrapadung et al., "Conjunctive Broadcast and Attribute-Based Encryption", ICIAP: International Conference on Image Analysis and Processing, 17th International Conference, Aug. 12, 2009, pp. 248-265.

* cited by examiner

METHOD, COMPUTER PROGRAM, AND DATA PROCESSING CIRCUITRY FOR ACCESS CONTROL TO ENCRYPTED DATA USING ATTRIBUTES OF THE DATA

CROSS-REFERENCE TO RELATED APPLICATIONS

The present application is based on PCT filing PCT/EP2021/067080, filed Jun. 23, 2021, which claims priority to EP 20187169.6, filed Jul. 22, 2020, and EP 20210800.7, filed Nov. 30, 2020, the contents of each are incorporated in entirety by reference.

FIELD

The present disclosure relates to a method, a computer program, and a data processing circuitry for sharing encrypted data, more specifically, but not exclusively, to a concept for sharing data encrypted through attribute-based encryption.

BACKGROUND

Attribute-based encryption (ABE) is a public-key encryption primitive which allows for flexible assignment of access rights. In particular, ABE is used for access control on content/data shared with multiple users. For example, ABE is used for data sharing in order to decrease a number of keys used for the encryption. For the access control, a master authority can encrypt the data to be shared with attributes and distribute cryptographic keys embedding a so-called "access policy". A basic idea of ABE is that a cryptographic key can decrypt the encrypted data if the respective attributes satisfy the access policy embedded in the cryptographic key. In this way, ABE offers "Content-Based Access Control". Besides ABE, other access-control mechanisms using attributes and policies for Content-Based Access Control are known.

A main challenge in ABE and other access-control mechanisms using attributes of data and policies for access control is the revocation of access rights granted using such access-control mechanisms (e.g. ABE).

SUMMARY

Hence there may be a demand for an improved concept enabling revocation of access rights in sharing data using access-control mechanisms based on attributes of data and policies for access control.

This demand can be satisfied by the subject-matter of the appended independent and dependent claims.

According to one aspect, the present disclosure relates to a method for sharing encrypted data. The method comprises encrypting first data with at least one first attribute of the first data. The first attribute satisfies a first access policy of a first cryptographic key to enable one or more first users holding the first cryptographic key to decrypt the encrypted first data using the first cryptographic key. Further, the method comprises encrypting second data with at least one second attribute of the second data. The second attribute is different from the first attribute. The method further provides for generating a second cryptographic key based on a second access policy including at least one logical connective of the first attribute and the second attribute for decrypting the encrypted first data and the encrypted second data using the second cryptographic key and providing the second cryptographic key to one or more second users to enable the second users to decrypt the encrypted first data and the encrypted second data.

In ABE or other access-control mechanisms using attributes of data and policies for access control, an encryption algorithm is used for encrypting data using attributes of the data as input to the encryption algorithm. In turn, a key generation algorithm can generate a cryptographic key having an access policy. A basic idea of ABE or other access-control mechanisms using attributes of data and policies for access control is that the cryptographic key can be used to decrypt data encrypted with attributes satisfying the access policy. It is noted that in some embodiments or access-control mechanisms, the cryptographic key may also comprise a plurality or a combination of keys which may be used to decrypt data encrypted with attributes satisfying the access policy. The attributes of the data can be predefined by a master authority sharing the data with users. In this way, the master authority can control access rights related to the encrypted data based on a selection of the attributes. This further allows to grant users access to data which has not been provided to the users.

The master authority can be understood as a legal owner of the data (i.e. data owner) or a data provider. In some applications, the data owner is also the data provider. It should therefore be noted that in the following, the data provider can be also understood as data owner or vice versa.

In applications of the above method, the data provider/owner can run an encryption algorithm configured to encrypt the first data using the first data and the first attribute as input to the encryption algorithm. Further, the data provider/owner can run a key generation algorithm for generating the first cryptographic key based on the first attribute as input to the key generation algorithm. It is noted that even though only a single first attribute is mentioned here, optionally multiple (first) attributes can be used as input of the encryption algorithm for encrypting the first data.

Both the encryption algorithm and the key generation algorithm may be executed on a data processing circuitry controlled by the data provider/owner.

The first attribute can be predefined by the data provider/owner and comprise a date, a time, a version number, or a data type of the first data. In some applications the first attribute is generated automatically using another algorithm intended for this purpose.

In order to grant the first users access to the encrypted first data, the data provider/owner can deliver the first cryptographic key to the first users.

The data provider/owner can further encrypt the second data using the second attribute as input to the encryption algorithm. Again, the second attribute can be predefined by the data provider/owner and comprise a date, a time, a version number, or a data type of the first data. Further, the second attribute can be defined such that the second attribute is different from the first attribute and that the second encrypted data cannot be decrypted using the first cryptographic key.

In this way, the data provider/owner can hinder the first users to access the encrypted second data.

In turn, the data provider/owner can provide the second users with the second cryptographic key the second access policy of which is satisfied by both the first and the second attribute, such that the second users can decrypt both the encrypted first and the encrypted second data using the second cryptographic key. To this end, the logical connective of the first and the second attribute may cause the second access policy to be satisfied by either the first attribute, the second attribute or a combination thereof.

The first users may partly correspond to the second users such that those of the first users corresponding to the second users are still able to decrypt the encrypted second data by using the second cryptographic key.

The aforementioned method allows so-called "access control" over the data. Particularly, the access control enables sharing data with dedicated users.

The second attribute can particularly relate to second data to be published (in the future), so-called "future data". Hence, the above method also provides access control over future data.

In particular, the above method provides revocation of access of the first users to the future data, i.e. the encrypted second data.

In some embodiments, the first attribute comprises a number and the method comprises determining the second attribute by incrementing the number.

In some embodiments, the second access policy includes an inclusive disjunction of the first attribute and the second attribute.

The inclusive disjunction can be understood as the logical connective representing the operator "OR" (i.e. "OR" gate).

Optionally, the second access policy can comprise multiple and/or other logical connectives like an exclusive disjunction ("XOR") or conjunction ("AND") of the first and the second attribute. In the latter case, the second data, for example, is encrypted with the first and the second attribute to enable the second users to access the encrypted second data.

In some embodiments, the method comprises providing the second encrypted data to the second users.

The data provider/owner, for example, provides the second data to a cloud storage accessible to the second users. Optionally, the data provider/owner can transmit the second encrypted data "directly" to the second users, e.g. their user equipment. The user equipment can be a mobile phone, a (private) computer, a tablet, or the like.

In some embodiments, the first data and/or the second data includes media data.

The media data, for example, comprise audio (e.g. music) or video data (e.g. movies). Thus, the method can be used to provide and revoke access to media data in connection with media streaming applications.

According to a further aspect, the present disclosure relates to a computer program comprising instructions which, when the computer program is executed by a computer, cause the computer to execute the method of any one of the preceding claims.

According to a further aspect, the present disclosure relates to a data processing circuitry for sharing encrypted data. The data processing circuitry is configured to encrypt first data with at least one first attribute of the first data. The first attribute satisfies a first access policy of a first cryptographic key to enable one or more first users holding the first cryptographic key to decrypt the encrypted first data using the first cryptographic key. The data processing circuitry is further configured to encrypt second data with at least one second attribute of the second data, wherein the second attribute is different from the first attribute and generate a second cryptographic key based on a second access policy including at least one logical connective of the first attribute and the second attribute for decrypting the encrypted first data and the encrypted second data using the second cryptographic key. Moreover, the data processing circuitry is configured to provide the second cryptographic key to one or more second users to enable the second users to decrypt the encrypted first data and the encrypted second data.

The above data processing circuitry is particularly intended for executing the above method. Features mentioned in connection with the above method can be therefore applied to the data processing circuitry by analogy, i.e. mutatis mutandis.

BRIEF DESCRIPTION OF THE FIGURES

Some examples of apparatuses and/or methods will be described in the following by way of example only, and with reference to the accompanying figures, in which.

DETAILED DESCRIPTION

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

As mentioned above, attribute-based encryption (ABE) or other access-control mechanisms based on attributes and policies can be used to grant (multiple) users access to data to be published ("future data"). A main challenge of such access-control mechanisms particularly is the revocation of access rights enabling the users to access "future data".

Hence, there may be a demand for an improved concept of sharing encrypted data, and in particular, for revoking access rights to access "future data" granted using such access-control mechanisms.

Figure 1:
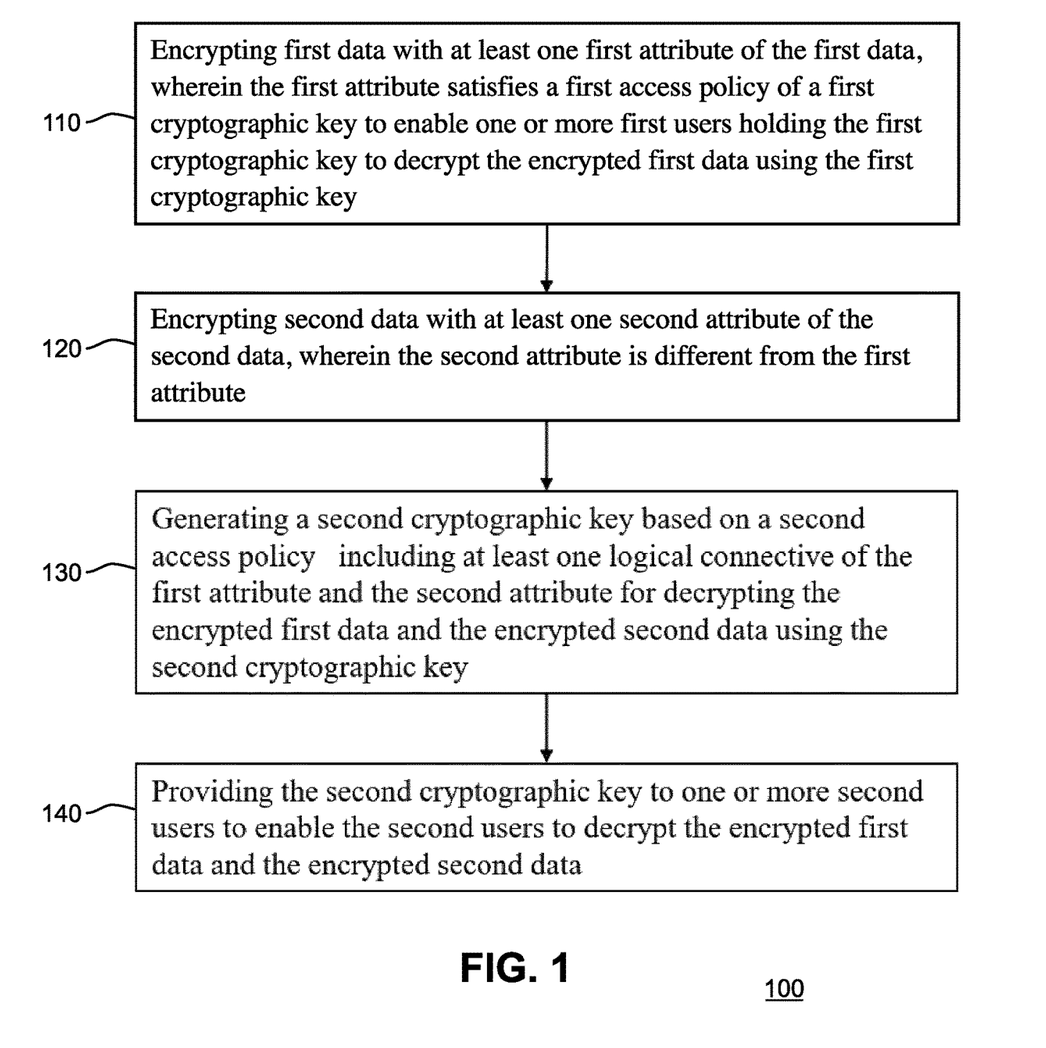
FIG. 1 shows a flow chart schematically illustrating a method for sharing encrypted data.
Figure 2:
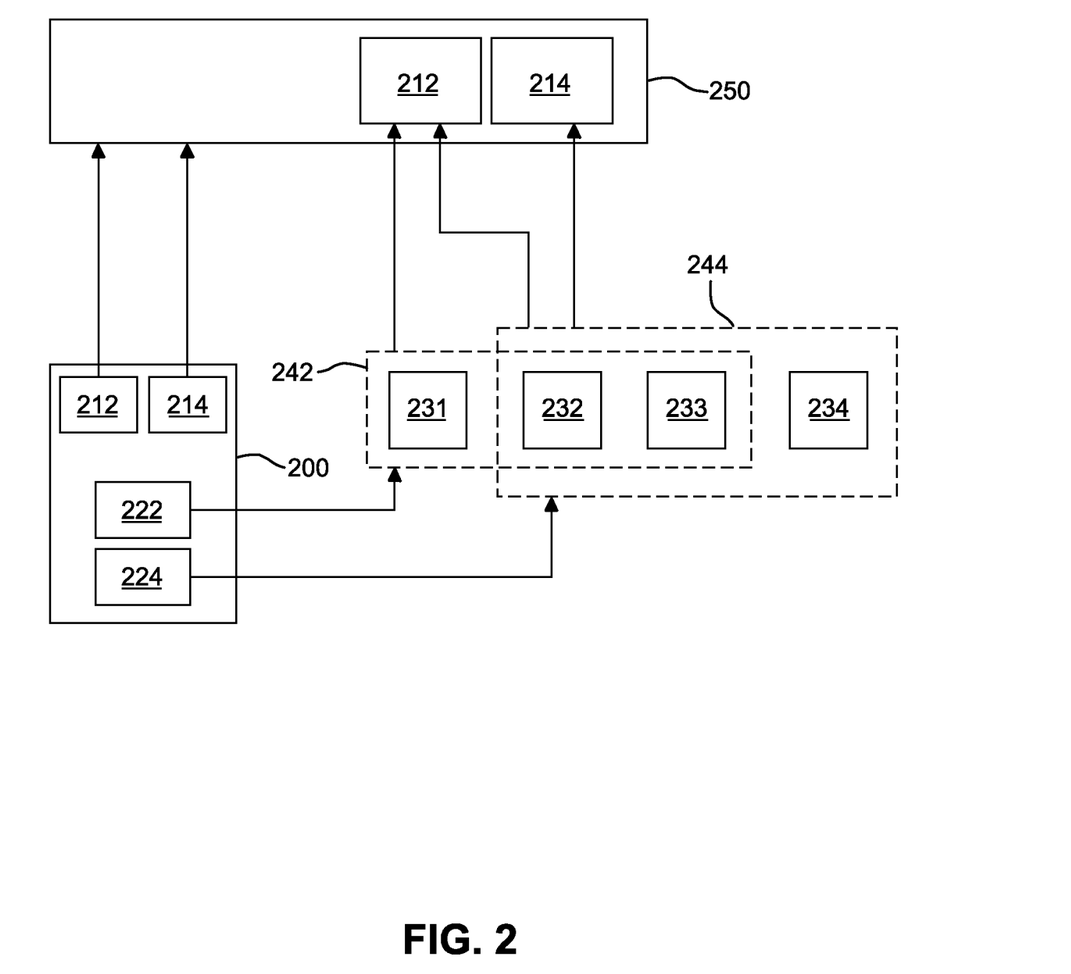
FIG. 2 illustrates a data processing circuitry for sharing encrypted data.
Figure 3:
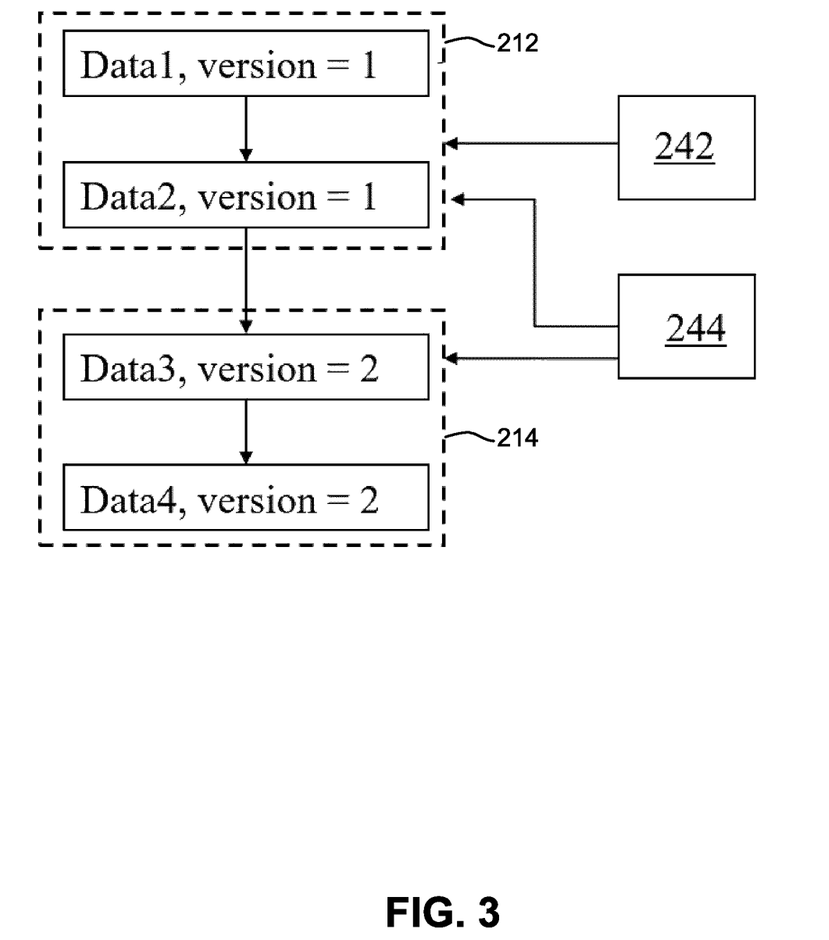
FIG. 3 schematically illustrates a use case of the above method for revocation of access to future data.

This demand may be satisfied by embodiments described with reference to the appended drawings (FIGS. 1, 2, and 3).

FIG. 1 schematically illustrates a method 100 for sharing encrypted data. Method 100 comprises encrypting 110 first data with at least one first attribute of the first data, wherein the first attribute satisfies a first access policy of a first cryptographic key to enable one or more first users holding the first cryptographic key to decrypt the encrypted first data using the first cryptographic key. Method 100 further comprises encrypting 120 second data with at least one second attribute of the second data. The second attribute is different from the first attribute. Further, method 100 comprises generating 130 a second cryptographic key based on a second access policy including at least one logical connective of the first attribute and the second attribute for decrypting the encrypted first data and the encrypted second data using the second cryptographic key and providing 140 the second cryptographic key to one or more second users to enable the second users to decrypt the encrypted first data and the encrypted second data.

For encrypting 110 and 120 the first and the second data, various access-control mechanisms (e.g. attribute-based encryption, ABE) may be used. Alternatively, other access-control mechanisms using attributes of data and policies for the access control can be used. A skilled person having benefit from the present disclosure will appreciate that, in context of the present disclosure, attribute-based encryption particularly refers to "key-policy" attribute-based encryption where the first and the second access policy are embedded in the first and the second cryptographic key, respectively, and the first and the second attribute are included in ciphertexts of the encrypted first and second data, respectively, whereas in "ciphertext-policy" attribute-based encryption, the opposite is the case.

Method 100, for example, is carried out by a data processing circuitry 200 shown in FIG. 2. Data processing circuitry 200 allows a master authority or a data provider/owner, to provide and revoke access rights of users to access data.

As can be seen from FIG. 2, the data processing circuitry 200 can generate encrypted first data 212 and encrypted second data 214 by encrypting first and second data, respectively, and transmit/upload the encrypted first and second data 212 and 214 to a data storage 250 accessible to users 231, 232, 233, and 234. Data storage 250 can be a cloud storage.

As outlined above, the data processing circuitry 200 may use an encryption algorithm for encrypting the first and the second data using one or more first attributes and one or more second attributes, respectively, as input to the encryption algorithm. In practice, the encryption algorithm may further use public parameters as input. As a result, respective ciphertexts of the encrypted first and second data 212 and 214 include the first and the second attributes, respectively. Therefore, the encrypted first and second data 212 and 214 can be understood as "tagged" or "encrypted" with the first and the second attributes, respectively. To be more specific, the encrypted first data 212 is encrypted with the first attributes and the encrypted second data 214 is encrypted with the second attributes.

The first and the second attributes may be "descriptive" or "content-related", i.e. related to content of the first and the second data. Particularly, the first and the second attributes are indicative of a title, a (version) number, or a data type of the first and the second data, respectively. The first and the second attributes both can be predefined by the data provider/owner. The data provider/owner, for example, "manually" or "automatically" generates and assigns the first and the second attributes, for example, using an algorithm.

In applications where the content of the first and the second data contains episodes of a TV series, the first and the second attributes may include numbers of respective episodes and/or seasons of the episodes.

In applications where the content of the first and the second data contains audio data, i.e. music or an audio drama, the first and the second attributes may be indicative of an artist, an author, and/or a title of the audio data.

The users 231, 232, 233, and 234, for example, can connect to the cloud storage 250 via a user interface using user equipment which can be a computer/laptop, a mobile phone, table, or the like.

The users 231, 232, and 233 represent a plurality of first users 242. The users 232, 233, and 234 represent a plurality of second users 244. That is, the plurality of first and second users 242 and 244 "overlap" with each other. It should be noted that in practice, the first and the second users may comprise several more users than in the simplified example of FIG. 2.

Data processing circuitry 200 may generate a first cryptographic key 222 having a first access policy. According to the basic idea of ABE or other access-control mechanisms using attributes of data and policies for access control, the first cryptographic key 222 can decrypt any data encrypted with attributes satisfying the first access policy. Hence, data processing circuitry 200 can define the first cryptographic key 222 such that the first attributes satisfy the first access policy to enable the first cryptographic key 222 to decrypt data encrypted with the first attributes, i.e. the encrypted first data 212. To this end, the data processing circuitry 200 can deploy a key generation algorithm using the first attributes as input to the key generation algorithm. In practice, the key generation algorithm further may use the public parameters as input.

In order to allow the first users 242 to decrypt, and thus access the encrypted first data 212 stored on the cloud storage 250, the data processing circuitry 200 provides the first users 242 with the first cryptographic key 222. For this, the data processing circuitry 200 can transmit the first cryptographic key 222 to the user equipment of the first users 242.

Analogously, the data processing circuitry 200 can generate a second cryptographic key 224 having a second access policy. Again, the data processing circuitry 200 may use the key generation algorithm but with the first and the second attributes as input to the key generation algorithm. In this way it can be achieved that both the first and the second attributes satisfy the second access policy.

The second access policy, for example, comprises a logical disjunction (e.g. a logical "OR" or logical "XOR") of the first and the second attributes. If the logical disjunction corresponds to the logical "XOR", the second access policy is satisfied if a ciphertext of data to be decrypted includes either the first or the second attributes. If the logical disjunction corresponds to the logical "OR", the second access policy is satisfied if the ciphertext of data to be decrypted includes either the first, the second attributes, or a combination thereof.

In accordance with the concept of ABE or other access-control mechanisms using attributes of data and policies for access control, the second cryptographic key hence can be used to decrypt both the encrypted first and the encrypted second data 212 and 214.

In order to enable the second users 244 to decrypt, and thus access both the encrypted first data 212 and the encrypted second data 214 stored on the cloud storage 250, the data processing circuitry 200 provides the second users 244 with the second cryptographic key 224. Consequently, the users 232 and 233, who are (simultaneously) both first and second users 242 and 244, have access to both the encrypted first and the encrypted second data 212 and 214.

In contrast, the first users 242 holding merely the first cryptographic key, i.e. user 231, cannot access the encrypted second data 214 stored on the cloud storage 250, as the second attributes do not satisfy the first access policy of the first users' first cryptographic key In this way, method 100 allows the data provider/owner to control capabilities (i.e. access rights) of the first and the second users 242 and 244 to access the encrypted first and the encrypted second data 212 and 214. In other words, method 100 enables access control.

In some applications, method 100 further enables control over access rights of the users 242 and 244 regarding data to be published (in the future), so-called "future data". In particular, method 100 allows to revoke access rights regarding future data.

FIG. 3 schematically illustrates a use case of the above method for revocation of access to future data. The shown use case particularly relates to scenarios in which users are to be granted access to data and, if necessary, revoked under agreements between the users and the data provider/owner. The agreements, for example, include temporary subscriptions of the first and the second users 242 and 244 to access data published by the data provider/owner.

As can be seen from FIG. 3, the encrypted first data 212 includes a first dataset "Data1" and a second dataset "Data2" both having a first version number, "version=1", as the first attribute.

With reference to the use case of FIG. 3, it should be assumed that the encrypted first data 212 have already been provided to the first users 242 together with the first cryptographic key 222 in accordance with the subscription of the first users 242. In order to enable the first users 242 to access Data1 and Data2, the first and the second dataset are encrypted with the first attribute "version=1" and the first access policy of the first cryptographic key 222 is satisfied by the first version number, "version=1".

In contrast to the encrypted first data 212, the encrypted second data 214 comprising a third dataset "Data3" and a fourth dataset "Data4" have not been published yet.

In the scenario of FIG. 3, the subscription of the first users 242, for example, has expired or been cancelled and therefore, the data provider/owner wants to hinder the first users 242 to access or decrypt data to be published in the future, i.e. the encrypted second data 214.

Still, the data provider/owner wants to grant the second users 244 access to the encrypted first and the encrypted second data 212 and 214, for example, in accordance with a still valid subscription of the second users 244.

For this, the data provider/owner can increment the first version number, "version=1", to obtain a second version number "version=2" as the second attribute, assign the second version number to Data3 and Data4, and provide the second users 244 with the second cryptographic key having a second access policy which can be satisfied by the first version number "version=1" and the second version number "version=2". The logical connective of the second access policy, for example, is defined as follows: "version=1" OR "version=2".

Alternatively, the logical connective is defined as follows: "version=1" XOR "version=2".

In either case of the logical connective, the second cryptographic key can be used to decrypt the encrypted first data 212 (i.e. Data1 and Data2) and the encrypted second data 214 (i.e. Data3 and Data4) while the first users 242 (merely) holding the first cryptographic key, i.e. user 231, are not able to decrypt the encrypted second data 214. In other words, access rights of user 231 to access future data, i.e. the encrypted second data 214, have been revoked.

Applications of method 100 and system 200, therefore, may be used for data sharing purposes (e.g. online music streaming or video streaming).

Further embodiments pertain to:
(1) A method for sharing encrypted data, the method comprising:
encrypting first data with at least one first attribute of the first data, wherein the first attribute satisfies a first access policy of a first cryptographic key to enable one or more first users holding the first cryptographic key to decrypt the encrypted first data using the first cryptographic key;
encrypting second data with at least one second attribute of the second data, wherein the second attribute is different from the first attribute;
generating a second cryptographic key based on a second access policy including at least one logical connective of the first attribute and the second attribute for decrypting the encrypted first data and the encrypted second data using the second cryptographic key; and
providing the second cryptographic key to one or more second users to enable the second users to decrypt the encrypted first data and the encrypted second data.
(2) The method of (1), wherein the first attribute and/or the second attribute comprise at least one of a date, a time, a version number, and a data type of the first and/or the second data.
(3) The method of (1) or (2), wherein the first attribute comprises a number and wherein the method comprises determining the second attribute by incrementing the number.
(4) The method of any one of (1) to (3), wherein the second access policy includes an inclusive disjunction of the first attribute and the second attribute.
(5) The method of any one of (1) to (4), further comprising providing the second encrypted data to the second users.
(6) The method of any one of (1) to (5), wherein the first data and/or the second data includes media data.
(7) A computer program comprising instructions which, when the computer program is executed by a computer, cause the computer to execute the method of any one of the preceding claims.
(8) A data processing circuitry for sharing encrypted data, wherein the data processing circuitry is configured to:
encrypt first data with at least one first attribute of the first data, wherein the first attribute satisfies a first access policy of a first cryptographic key to enable one or more first users holding the first cryptographic key to decrypt the encrypted first data using the first cryptographic key;
encrypt second data with at least one second attribute of the second data, wherein the second attribute is different from the first attribute;
generate a second cryptographic key based on a second access policy including at least one logical connective of the first attribute and the second attribute for decrypting the encrypted first data and the encrypted second data using the second cryptographic key; and provide the second cryptographic key to one or more second users to enable the second users to decrypt the encrypted first data and the encrypted second data.

(9) The data processing circuitry of (8), wherein the first attribute and/or the second attribute comprise at least one of a date, a time, a version number, and a data type of the first and/or the second data.

(10) The data processing circuitry of (8) or (9), wherein the first attribute comprises a number and wherein the method comprises determining the second attribute by incrementing the number.

(11) The data processing circuitry of any one of (8) to (10), wherein the second access policy includes an inclusive disjunction of the first attribute and the second attribute.

(12) The data processing circuitry of any one of (8) to (11), wherein the data processing circuitry is further configured to provide the second encrypted data to the second users.

(13) The data processing circuitry of any one of (8) to (12), wherein the first data and/or the second data includes media data.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor, or other programmable hardware component. Thus, steps, operations, or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The invention claimed is:

1. A method for sharing encrypted data, the method comprising:

encrypting first data with at least one first attribute of the first data, wherein the first attribute satisfies a first access policy of a first cryptographic key to enable one or more first users holding the first cryptographic key to decrypt the encrypted first data using the first cryptographic key;

encrypting second data with at least one second attribute of the second data, wherein the second data is different from the first data and the second attribute is different from the first attribute that the first data was encrypted with;

generating a second cryptographic key based on a second access policy including at least one logical connective of the first attribute and the second attribute for decrypting the encrypted first data that was encrypted with first attribute using the second cryptographic key and for decrypting the encrypted second data that was encrypted with the second attribute of the second data using the second cryptographic key; and providing the second cryptographic key to one or more second users to enable the second users to decrypt the encrypted first data using the second cryptographic key and to enable the second users to decrypt the encrypted second data using the second cryptographic key.

2. The method of claim 1, wherein the first attribute and/or the second attribute comprise at least one of a date, a time, a version number, and a data type of the first data and/or the second data.

3. The method of claim 1,
wherein the first attribute comprises a number, and
wherein the method comprises determining the second attribute by incrementing the number.

4. The method of claim 1, wherein the second access policy includes an inclusive disjunction of the first attribute and the second attribute.

5. The method of claim 1, further comprising providing the second encrypted data to the second users.

6. The method of claim 1, wherein the first data and/or the second data includes media data.

7. A non-transitory computer readable medium storing computer program comprising instructions which, when the computer program is executed by a computer, cause the computer to execute the method of claim 1.

8. A data processing circuitry for sharing encrypted data, wherein the data processing circuitry is configured to:
- encrypt first data with at least one first attribute of the first data, wherein the first attribute satisfies a first access policy of a first cryptographic key to enable one or more first users holding the first cryptographic key to decrypt the encrypted first data using the first cryptographic key;
- encrypt second data with at least one second attribute of the second data, wherein the second data is different from the first data and the second attribute is different from the first attribute that the first data was encrypted with;
- generate a second cryptographic key based on a second access policy including at least one logical connective of the first attribute and the second attribute for decrypting the encrypted first data that was encrypted with first attribute using the second cryptographic key and for decrypting the encrypted second data that was encrypted with the second attribute of the second data using the second cryptographic key; and
- provide the second cryptographic key to one or more second users to enable the second users to decrypt the encrypted first data using the second cryptographic key and to enable the second users to decrypt the encrypted second data using the second cryptographic key.

9. The data processing circuitry of claim 8, wherein the first attribute and/or the second attribute comprise at least one of a date, a time, a version number, and a data type of the first data and/or the second data.

10. The data processing circuitry of claim 8,
wherein the first attribute comprises a number, and
wherein the method comprises determining the second attribute by incrementing the number.

11. The data processing circuitry of claim 8, wherein the second access policy includes an inclusive disjunction of the first attribute and the second attribute.

12. The data processing circuitry of claim 8, wherein the data processing circuitry is further configured to provide the second encrypted data to the second users.

13. The data processing circuitry of claim 8, wherein the first data and/or the second data includes media data.

* * * * *